(No Model.)

A. G. WATERHOUSE.
AUTOMATIC REGULATOR FOR DYNAMO ELECTRIC MACHINES.

No. 294,170. Patented Feb. 26, 1884.

Witnesses:
Ernest Abshagen
Thos. Dooney

Inventor:
A. G. Waterhouse,
By his Attorney: H. C. Townsend

UNITED STATES PATENT OFFICE.

ADDISON G. WATERHOUSE, OF NEW YORK, N. Y., ASSIGNOR, BY MESNE ASSIGNMENTS, TO THE SCHUYLER ELECTRIC LIGHT COMPANY, OF SAME PLACE.

AUTOMATIC REGULATOR FOR DYNAMO-ELECTRIC MACHINES.

SPECIFICATION forming part of Letters Patent No. 294,170, dated February 26, 1884.

Application filed June 12, 1883. (No model.)

*To all whom it may concern:*

Be it known that I, ADDISON G. WATERHOUSE, a citizen of the United States, and a resident of New York, in the county of New York and State of New York, have invented certain new and useful Improvements in Automatic Regulators for Dynamo-Electric Machines, of which the following is a specification.

My invention relates to the regulation of the current of dynamo-electric machines; and it consists in a novel arrangement and connection of the field-magnet coils, whereby such regulation is effected automatically in accordance with changes in the distribution of current in such coils, brought about directly by changes in the working-resistance.

My invention consists in dividing the coils upon the field-magnet into two sets, so arranged that if the current in one set be increased while the current in the other is diminished, the consequent poles or points of greatest magnetization will be shifted or distorted, and in placing one set of coils in a derived circuit around the working-resistance and the other set in direct circuit, preferably with such working-resistance.

Figure 1:
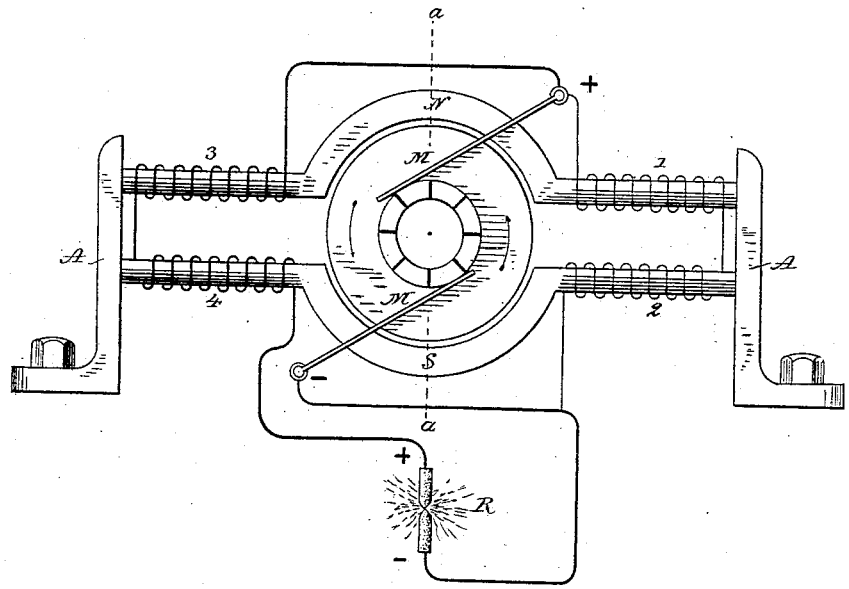
Figure 2:
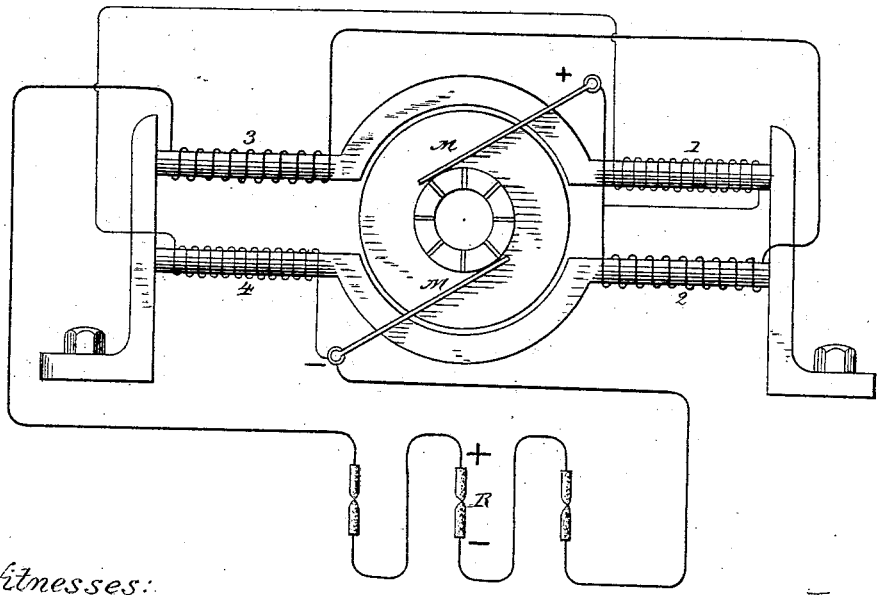

In the accompanying drawings, Figure 1 shows in side view a dynamo-electric machine whose field-coils are arranged so as to effect a regulation according to my invention. Fig. 2 shows an equivalent arrangement of coils.

Referring to Fig. 1, A indicates an ordinary field-of-force magnet-frame, having curved pole-pieces N S, between which revolves an armature of any suitable kind. The field-magnet coils 1, 2, 3, and 4 are wound in the usual way, so as to produce in the field-magnet pole-pieces a consequent polarity on the line $a\,a$; or, in other words, coils 1 and 2 conspire to produce south magnetization in pole-piece S, and coils 3 and 4 conspire to produce north magnetism in pole-pieces N. For the purposes of my invention, the consequent points, or points of greatest magnetism, may be taken to be on the line $a\,a$, when the magnetizing effect of the coils is equal. M M indicate the usual commutator-brushes, and the arrow 5 indicates the direction of revolution of the armature. Coils 1 and 2 are in a circuit independent of coils 3 and 4, so that there may be a flow of current, or a variation thereof, in one set of coils independently of the flow of current in the other set. If, by any means, the currents in coils 1 2 be diminished, while that in 3 4 is increased or remains stationary, the consequent points on line $a\,a$ will shift toward one another, and the effect will be, by reason of the distortion or displacement of the points of maximum currents or polarity, to vary the electro-motive force of the current generated by the armature. Coils 3 4 are included in circuit with a working-resistance, R, such as an electric lamp or series of electric lamps, while coils 1 2 are of higher resistance, and are in a derived circuit around the working-resistances. Let it be supposed that the whole number of lamps or other devices are in circuit, so that the working-resistance is normal. The distribution of currents in the two sets of coils 1 2 and 3 4 will then be such that the consequent points will be on a line $a\,a$, or upon the line at which the armature will most efficiently operate. If, now, the number of lights be gradually diminished, thus diminishing the external resistance, more current will flow in 3 4 and less in 1 2, thus causing a displacement of the consequent points, as before described, and a consequent diminution of the electro-motive force generated by the armature until the current on the working-circuit is restored to its normal. The reintroduction of the lamps will restore the proper proportion of resistances, so as to cause a normal distribution of current in the two branches, and thus restore the consequent points to their normal position. Instead of causing the consequent points to shift toward one another, as in Fig. 1, the coils may be so wound as to cause them to shift in the same direction. This may be effected by connecting the coils in groups, as shown in Fig. 2, coils 1 and 4 being, for instance, in the derived circuit and coils 2 and 3 in the main circuit. The effect of diminishing the flow of current in coils 1 4, Fig. 2, and simultaneously increasing it in 2 and 3, which will occur whenever the external resistance decreases, will be to cause a shifting of both consequent points backward in a direction contrary to the direction of revolution of the armature, and a resultant lessening of the electro-motive force. A restoration of the electro-motive force to its maximum will be effected as the consequent points are turned back toward their normal position, which is brought about by a reintroduction of working-resistances. Other connections and arrangements of the coils in sets might be used for effecting the same object.

In another application for patent filed by me June 12, 1883, Serial No. 97,860, I have laid claim to increasing the magnetizing action in one portion of the field-magnet circuit simultaneously with a decrease in another portion, so as to shift the consequent point without making any change in the total magnetism of the field-magnet. I therefore make no broad claim of such character in this application.

What I claim as my invention is—

1. In a dynamo-electric machine, field-magnet coils divided into sets, as described, such that a diminution or a variation of current in one set will cause a shifting of the consequent points of the field-magnet, one of said sets being arranged in a derived circuit around the working-resistance.

2. The combination, in a dynamo-electric machine, of two field-magnet coils or bobbins conspiring to produce consequent polarity in an intermediate field-pole, one of said coils or bobbins being arranged in a direct circuit with the working-resistances, and the other, of higher resistance, being arranged in a derived circuit around the working-resistances.

3. The combination, substantially as described, of four field-magnet coils wound in the manner described, to produce consequent polarity in the field-of-force pole-pieces, one set of coils being arranged in a direct circuit with the working-resistance and the other in a derived circuit, so that a variation of the distribution of currents in said coils consequent upon change of working-resistance will shift or distort the consequent points of the pole-pieces.

4. The combination, substantially as described, with a field-of-force magnet, of four magnetizing-coils acting to produce consequent poles, said coils being divided into two sets, each including two diagonally-opposite coils, one of which sets is in a derived circuit around the working-resistances, while the other set is in direct circuit therewith.

Signed at New York, in the county of New York and State of New York, this 4th day of June, A. D. 1883.

ADDISON G. WATERHOUSE.

Witnesses:
THOS. TOOMEY,
ERNEST ABSHAGEN.